US012433208B2

(12) United States Patent
Mandel et al.

(10) Patent No.: US 12,433,208 B2
(45) Date of Patent: Oct. 7, 2025

(54) COOLING AIR ROUTING ON AN ELECTRIC BLOWER APPARATUS

(71) Applicant: Andreas Stihl AG & Co. KG, Waiblingen (DE)

(72) Inventors: Roland Mandel, Stuttgart (DE); Sebastian Piekarek, Stuttgart (DE); Alexander Buchmann, Schwaikheim (DE); Manuel Waiblinger, Stuttgart (DE); Thilo Stuerzel, Remshalden (DE); Mathias Schmitz, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 383 days.

(21) Appl. No.: 18/069,803

(22) Filed: Dec. 21, 2022

(65) Prior Publication Data

US 2023/0189727 A1 Jun. 22, 2023

(30) Foreign Application Priority Data

Dec. 21, 2021 (EP) ..................................... 21216628

(51) Int. Cl.
*A01G 20/47* (2018.01)
*B25F 5/00* (2006.01)

(52) U.S. Cl.
CPC .............. *A01G 20/47* (2018.02); *B25F 5/008* (2013.01)

(58) Field of Classification Search
CPC ................................ A01G 20/47; F04D 29/66
See application file for complete search history.

(56) References Cited

U.S. PATENT DOCUMENTS 4,223,419 A * 9/1980 Sato ...................... E01H 1/0809
15/327.5
5,233,946 A * 8/1993 Yamami .................... F01P 5/06
123/41.63

(Continued)

FOREIGN PATENT DOCUMENTS

CN 205423213 U 8/2016
CN 211692946 U * 10/2020

(Continued)

OTHER PUBLICATIONS

WO 03038281 A1—English Machine Translation (Year: 2003).*

*Primary Examiner* — Marc Carlson
(74) *Attorney, Agent, or Firm* — Walter Ottesen, P.A.

(57) ABSTRACT

The disclosure relates to an electric blower apparatus having a blower spiral and a fan wheel rotating in the blower spiral. For driving the fan wheel, an electric motor is disposed on an axial end face of the blower spiral, the drive shaft of the electric motor protruding through a shaft opening in the axial end face and into the blower spiral and being connected to the fan wheel. Configured in the axial end face of the blower spiral is a cooling air opening by way of which a cooling air flow that flows about the electric motor is routed. To guarantee sufficient cooling of the driving electric motor at a minimal consumption of electric energy, it is provided that the cooling air opening is disposed in a pressure region of the blower spiral such that the cooling air flow to the electric motor is a pressurized air flow.

18 Claims, 10 Drawing Sheets

(56) References Cited

U.S. PATENT DOCUMENTS

| | | | | |
|---|---|---|---|---|
| 6,109,865 A | * | 8/2000 | Ishikawa | F04D 17/12 415/58.1 |
| 6,283,726 B1 | * | 9/2001 | Fackelmann | F04D 29/5806 415/58.4 |
| 6,305,048 B1 | * | 10/2001 | Salisian | A47L 9/2873 15/327.5 |
| 2001/0005482 A1 | * | 6/2001 | Wolpert | B08B 5/02 417/234 |
| 2002/0060107 A1 | * | 5/2002 | Kamoshita | F04D 29/664 181/224 |
| 2002/0159881 A1 | * | 10/2002 | Marshall | F04D 29/281 415/102 |
| 2006/0059654 A1 | * | 3/2006 | Kremsler | A47L 5/14 15/405 |
| 2006/0162116 A1 | * | 7/2006 | Andresen | E01H 1/0809 15/327.5 |
| 2008/0134997 A1 | * | 6/2008 | Ito | F01P 5/06 123/41.65 |
| 2015/0377253 A1 | * | 12/2015 | Shibata | F04D 25/082 415/119 |
| 2016/0108924 A1 | * | 4/2016 | Conrad | F04D 25/0673 417/423.7 |
| 2016/0198636 A1 | * | 7/2016 | Poole | A01G 20/47 15/327.5 |
| 2019/0029191 A1 | * | 1/2019 | Poole | A01G 20/47 |
| 2020/0236875 A1 | | 7/2020 | Poole et al. | |
| 2020/0390041 A1 | * | 12/2020 | Koide | F04D 17/16 |
| 2021/0148372 A1 | * | 5/2021 | Naka | F04D 27/004 |
| 2022/0178097 A1 | * | 6/2022 | Remy | A01G 20/47 |

FOREIGN PATENT DOCUMENTS

| | | | | |
|---|---|---|---|---|
| DE | 199 59 557 B4 | | 6/2001 | |
| DE | 602 12 495 T2 | | 6/2007 | |
| DE | 10 2015 008 189 A1 | | 12/2015 | |
| DE | 202020002177 U1 | * | 9/2020 | A01G 20/47 |
| DE | 10 2020 006 641 A1 | | 5/2021 | |
| EP | 3330545 A1 | * | 6/2018 | F04D 25/0606 |
| EP | 4 066 627 A1 | | 10/2022 | |
| FR | 2 831 928 A1 | | 5/2003 | |
| JP | 2002-21794 A | | 1/2002 | |
| JP | 2002021794 A | * | 1/2002 | A47L 5/22 |
| WO | WO-03038281 A1 | * | 5/2003 | F04D 25/082 |
| WO | 2020/161421 A1 | | 8/2020 | |

\* cited by examiner

COOLING AIR ROUTING ON AN ELECTRIC BLOWER APPARATUS

CROSS-REFERENCE TO RELATED APPLICATIONS

This application claims priority of European patent application no. 21 216 628.4, filed Dec. 21, 2021, the entire content of which is incorporated herein by reference.

TECHNICAL FIELD

The disclosure relates to an electric blower apparatus having a blower spiral and a fan wheel rotating in the blower spiral. An electric motor is disposed on an axial end face of the blower spiral, the drive shaft of the electric motor protruding through a shaft opening in the axial end face of the blower spiral into the latter and being connected to the fan wheel. At least one cooling air opening is provided in the axial end face on which the electric motor is disposed, a cooling air flow which is routed through or about the electric motor and cools the latter being discharged from the blower spiral by way of the at least one cooling air opening.

BACKGROUND

The electric motor in an electric blower apparatus is typically actuated by control electronics. Control electronics of this type can serve for monitoring the electric load of the electric motor as well as of a battery pack that provides the electric energy. The actuating signal of an actuating element (for example, a switching lever) to be actuated by the operator is supplied to the control electronics, the control electronics controlling the operation and the rotating speed of the electric motor as a function of the actuating signal.

The control electronics include power components which switch and feedback-control the high currents in a range from 30 A up to 150 A or more that arise in the operation of the electric motor. The waste heat which occurs in particular on the power components has to be discharged by way of suitable cooling in order to guarantee the operational reliability of the control electronics.

It is known for a cooling air flow to be suctioned from the blower spiral and for the cooling air flow to be used for cooling the electric motor as well as for cooling the control electronics. To this end, the electric motor has a cooling air blower which by way of an opening in the axial end face of the blower spiral inducts a cooling air flow. This inducted cooling air flow is routed by way of the electric motor. The cooling air flow exiting the electric motor is then supplied to the control electronics in order for the power components to be cooled. The cooling air of the electric motor, which has already been heated, can guarantee sufficient cooling of the power components only to some extent.

Besides the drive output of the electric motor, the latter also has to drive the cooling air blower in order to convey a cooling air flow of sufficient quantity to the electric motor. The electric energy required for driving the cooling air blower cannot be utilized for driving the fan wheel. An efficient energy management is desirable in particular in electric blower apparatuses operated by a battery pack so as to provide a high blower output, on the one hand, and to guarantee a long duration of operation, on the other hand.

SUMMARY

It is an object of the disclosure to provide an electric blower apparatus wherein sufficient cooling of the driving electric motor is guaranteed at a minimal consumption of electric energy.

This object is, for example, achieved according to an electric blower apparatus including: a blower spiral having an axial end face defining a shaft opening; a fan wheel configured to rotate in the blower spiral; an electric motor disposed on the axial end face of the blower spiral and having a drive shaft which protrudes through the shaft opening in the axial end face and into the blower spiral; the drive shaft being connected to the fan wheel; the axial end face further defining a first cooling air opening, wherein a cooling air flow that cools the electric motor is routed by way of the cooling air opening; the first cooling air opening being disposed in a pressure region of the blower spiral; and, the cooling air flow to the electric motor is a pressurized air flow having a flow direction which from the blower spiral is directed by way of the first cooling air opening to the electric motor.

The cooling air flow supplied to the electric motor exits a pressure region of the blower spiral, wherein a flow direction which is directed from the blower spiral to the electric motor is provided. This first cooling air opening in a pressure region of the blower spiral causes a pressurized air flow towards the electric motor such that the inflowing cooling air flow is a pressurized air flow. A cooling fan driven by the electric motor, or a fan wheel installed in the electric motor, respectively, can be dispensed with. The electric energy supplied to the electric motor can be utilized predominantly for driving the fan wheel in the blower spiral.

In order to achieve a high cooling effect it is provided that, after the exit of the cooling air flow from the first cooling air opening to the electric motor, a flow throttle is disposed in the flow path of the cooling air flow. As a result, the dwell time of the cooling air in the region of the electric motor can be increased. An increased dwell time of the cooling air in the region of the electric motor leads to an improved cooling effect.

In an embodiment of the disclosure, the first cooling air opening for the cooling air flow to the electric motor includes at least one, up to a plurality of, partial air openings in the axial end face of the blower spiral. A plurality of partial air openings are disposed sequentially in the rotation direction of the fan wheel. In this way, three partial air openings can be disposed sequentially in the rotation direction of the fan wheel, for example, wherein the partial air openings are advantageously of identical configuration and are in particular equidistantly spaced apart. When measured from the center of a partial air opening, the partial air openings are sequential at an angular spacing of 120° in the rotation direction of the fan wheel. It is provided in particular that the partial air openings are disposed on a common circumferential circle about the drive shaft of the electric motor.

In a further embodiment of the disclosure, it is provided that a partial air opening is configured as an air channel having an air inlet and an air outlet. The air inlet is provided within the blower spiral on the inside of the axial end face. The air outlet lies outside the blower spiral on the outside of the axial end face. An air-conducting flow ramp is configured between the air inlet on the inside of the axial end face and the air outlet on the outside of the axial end face. The flow ramp in the rotation direction of the fan wheel slopes from the air inlet towards the air outlet. The masses of air moved by the fan wheel flow in the rotation direction of the fan wheel such that the flow ramp, which slopes in the rotation direction of the fan wheel, diverts the pressurized air flow without substantially disturbing the flow and in particular without changing the flow direction. It is to be pointed out that, as a result of the cyclone effect of the masses of air accelerated in the rotation direction of the fan wheel, it is guaranteed that the air flow diverted by the first cooling air opening, or the air flow diverted by the partial air openings of the first cooling air opening, respectively, is at least free of coarse contamination. The risk of intense contamination of the cooling air routes and/or of the cooling air channels by coarse contamination is thus avoided.

Control electronics are provided for operating the electric motor. The control electronics, as a function of the output signal of an operator-controlled element, are suitable for energizing the electric motor from an electrical energy source. In this way, the rotating speed of the electric motor can be adjusted in a manner corresponding to the supplied output signal of the operator-controlled element. A second cooling air opening for cooling the control electronics is configured in the axial end face of the blower spiral. A second cooling air flow which is supplied to the control electronics is diverted from the blower spiral by way of the second cooling air opening. The second cooling air flow is a pressurized air flow.

In a particular embodiment of the disclosure it is provided that the first cooling air flow, which from the blower spiral is routed to the electric motor by way of the first cooling air opening, and the second cooling air flow, which by way of the second cooling air opening is routed to the control electronics, are mutually separate cooling air flows. Variations in the first cooling air flow do not result in any variations in the second cooling air flow and vice versa.

The configuration of two mutually separate cooling air flows for independently cooling two heat sources, in particular in an electric blower apparatus, represents an invention in its own right. As a result of the separation of the cooling air flows, the first cooling air flow can be conceived for efficiently cooling a first heat source, and the second cooling air flow can be configured for efficiently cooling a second heat source. This is advantageous in particular when the heat sources to be cooled have dissimilar cooling requirements.

It is provided according to the disclosure that the second cooling air opening for the second cooling air flow has a larger radial spacing from the shaft opening, or from the rotational axis of the drive shaft, respectively, than the first cooling air opening for the first cooling air flow. The first cooling air opening is advantageously provided in the region of a lower pressure level of the blower spiral in the axial end face of the blower spiral. The second cooling air opening is configured in the region of a higher pressure level of the blower spiral in the end face of the blower spiral.

In an embodiment of the disclosure, the electric motor is received in a motor housing of which the interior configures a first cooling air chamber. The control electronics are received in an electronics housing in which a further cooling air chamber, which is separate from the cooling air chamber of the motor housing, is configured. The configuration is provided in particular such that the first cooling air flow enters the cooling air chamber of the motor housing by way of the first cooling air opening, and the second cooling air flow enters the further cooling air chamber of the electronics housing by way of the second cooling air opening.

It can be expedient for the cooling air flowing into the motor housing to be subsequently supplied to the electronics housing having the control electronics. Cooling air routing in which the cooling air supplied to the electronics housing is subsequently supplied to the motor housing is also advantageous.

The motor housing is advantageously configured so as to be open at the end face and when being assembled on the end face of the blower spiral to be closed by the axial end face of the blower spiral. The motor housing can be plugged onto an annular wall of the axial end face of the blower spiral such that further fastening measures can be dispensed with.

It is provided in particular that the motor housing and the electronics housing are held on the same axial end face of the blower spiral. The motor housing and the electronics housing can be mutually separate housing components. In a particular embodiment of the disclosure, the motor housing and the electronics housing form a common housing in which a receptacle space for the electric motor, on the one hand, and a separate receptacle space for the electronics, on the other hand, are configured. This can result in advantages in terms of the wiring between the electric motor and the electronics. A common housing results in advantages during assembly.

The position of the first cooling air opening is provided in particular in such a manner that the first cooling air opening is adjacent to the shaft opening. The first cooling air opening preferably lies radially within the fastening elements of a support flange of a motor mounting by way of which the electric motor is held on the axial end face of the blower spiral.

In an embodiment of the disclosure, a further cooling air opening can be provided in the axial end face of the blower spiral. The further cooling air flow, which exits the further cooling air opening in particular as a pressurized air flow, is directed into a housing duct in which a battery pack is inserted. The cooling air directed into the housing duct flows outward through a gap between the battery pack and the housing duct, cooling of the battery pack being achieved as a result.

An independent inventive concept lies in supplying a cooling air flow diverted from the blower spiral by way of a cooling air opening and/or an exhaust air flow exiting the motor housing and/or the electronics housing to the back plate. The back plate is expediently configured in such a manner that the cooling air flow and/or an exhaust air flow passes through the back plate. In this way, the back of a user can be cooled at high ambient temperatures or heated at low ambient temperatures.

The assembly is expediently configured such that the cooling air flow and/or an exhaust air flow are/is supplied to the back plate by way of a controllable flow valve. The flow valve is configured for operation by the user such that the user can adjust a temperature which is perceived to be comfortable for his/her back.

It can be expedient for an exhaust air flow exiting the motor housing and/or the electronics housing to be supplied to an intake opening of the blower spiral. An exhaust air flow blown out into the environment is avoided in this way.

BRIEF DESCRIPTION OF THE DRAWINGS

The invention will now be described with reference to the drawings wherein.

DETAILED DESCRIPTION

Figure 1:
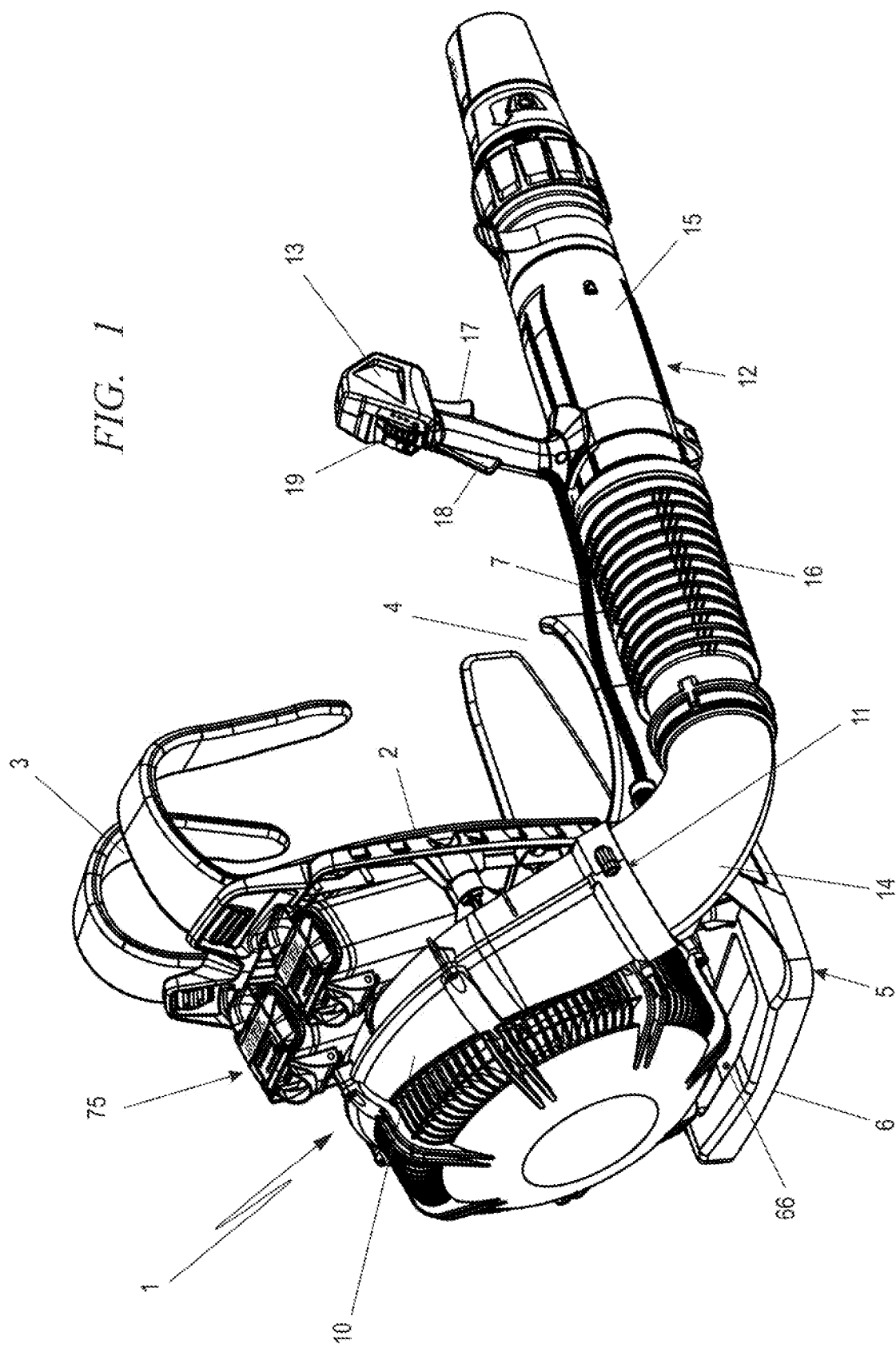
FIG. 1 shows a perspective illustration of an electric backpack blower apparatus in a view from the rear.

The embodiment of a blower apparatus 1 illustrated in FIG. 1 is a backpack blower apparatus. Other embodiments of the blower apparatus, such as a hand-held blower apparatus, a mobile blower apparatus or the like, can also be equipped with the subject-matter of the disclosure.

The backpack blower apparatus 1 includes a back plate 2 which via schematically illustrated shoulder straps 3 and a schematically illustrated hip belt 4 is established on the back of a user. The back plate 2 is part of a carrier 5 which is provided with a base plate 6. The back plate 2 and the base plate 6 form the carrier 5 which in the lateral view is configured so as to be L-shaped. The base plate 6 advantageously has a central opening 66. Ambient air from below the blower apparatus 1 can be inducted by way of the opening 66. The base plate 6 can expediently be configured as a bracket, in particular as a U-shaped bracket. The ends of the bracket are established on the back plate. The bracket is advantageously made of a metallic material or a metal alloy.

A blower spiral 10 which has an outlet 11 for connecting a blower tube 12 is held on the back plate 2. A handle 13 for holding and guiding the blower tube 12 is established on the blower tube 12. The blower tube 12 has a rear rigid tube section 14 for connecting to the outlet 11 of the blower spiral 10. A flexible tube section 16 which is connected to a front rigid tube section 15 is connected to the rear rigid tube section 14. The handle 13 is established on the front tube section 15. The front tube section 15 is pivotable in all spatial directions relative to the rear tube section 14.

Operator-controlled elements such as, for example, a switching lever 17 (in the function of an "accelerator"), a switching lever lock 18 or further suitable operator-controlled elements 19, are provided in the handle 13. The operator-controlled elements by way of a connecting line 7 are connected to control electronics 40 for operating an electric motor 30 (FIGS. 2, 3).

Figure 2:
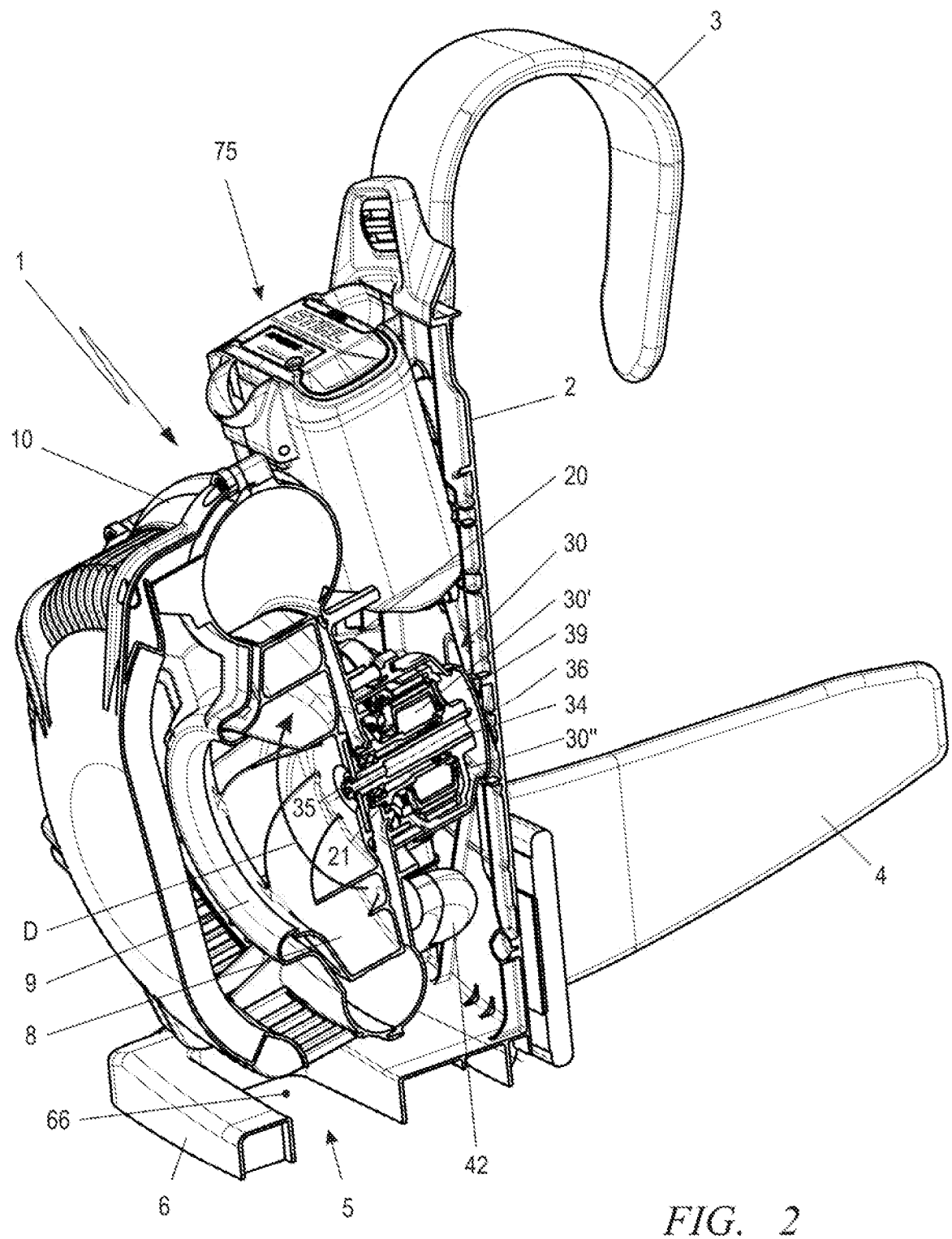
FIG. 2 shows a section through the electric backpack blower apparatus as per FIG. 1 at the height level of the drive shaft of an electric motor.
Figure 3:
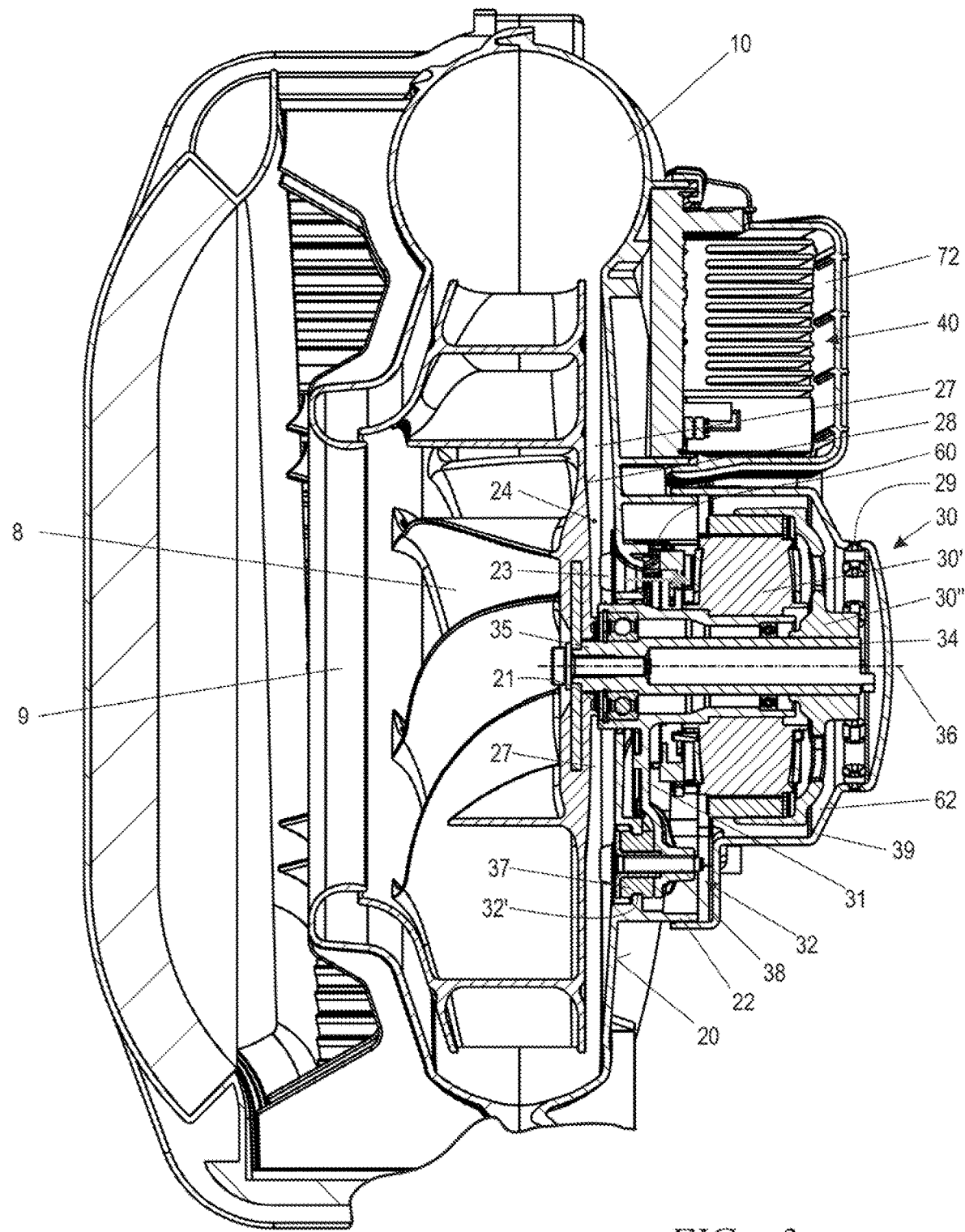
FIG. 3 in an enlarged illustration shows a section through the blower spiral of the blower apparatus at the height level of the drive shaft of the electric motor.

As is shown in FIG. 2, a fan wheel 8 which by way of an intake opening 9 axially inducts air and conveys the latter radially into the blower spiral 10 and by way of the outlet 11 towards the blower tube 12 is disposed in the blower spiral 10. The fan wheel 8 is driven by the electric motor 30 which is disposed on an axial end face 20 of the blower spiral 10. The drive shaft 34 of the electric motor 30 protrudes through a shaft opening 21 in the axial end face 20 of the blower spiral 10 and into the blower spiral 10. The inward-protruding end section 35 of the drive shaft 34 is operatively connected in a rotationally fixed manner to the fan wheel 8.

Figure 4:
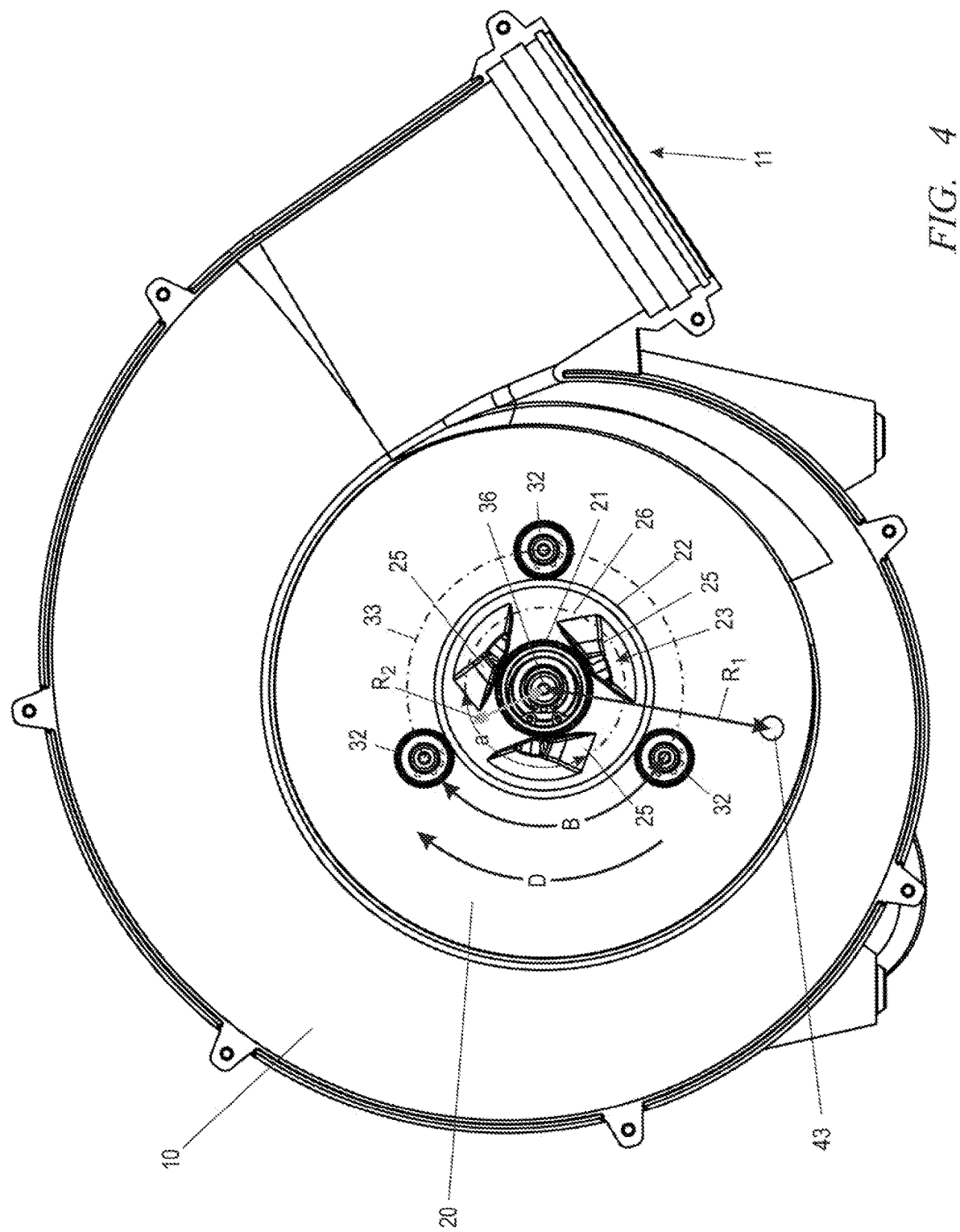
FIG. 4 shows an internal view onto an axial end face of the blower spiral with the illustration of a plurality of partial air openings as the first cooling air opening for a first cooling air flow, and having a second cooling air opening for a second cooling air flow, separate from the first cooling air flow.

The electric motor 30 has a support flange 31 (FIG. 3) which in the embodiment shown is held on the axial end face 20 of the blower spiral 10 by way of three fastening elements 32. As is shown in FIG. 4, adjacent fastening elements 32 in the rotation direction D of the fan wheel 8 are disposed at a mutual spacing B. The three-point fastening of the electric motor to the axial end face 20 of the blower spiral 10, shown in the embodiment, in the rotation direction D of the fan wheel 8 has equidistant spacings B of the fastening elements 32. The fastening elements 32 lie in particular on a common circle 33 (FIG. 4) in particular on a common circle 33 about the rotational axis 36 of the drive shaft 34.

A fastening element 32 of the electric motor 30 is composed substantially of an anti-vibration element 37 which is held so as to sit in an intake 32' (FIG. 3) in the axial end face 20 of the blower spiral 10. The anti-vibration element 37 via a fastening screw 38 is captively held on the support flange 31. As a result of the anti-vibration elements 37 of the fastening elements 32, the electric motor 30 in terms of vibrations is decoupled from the blower spiral 10 such that operating with reduced noise is possible.

The electric motor 30 is a so-called external rotor motor, that is, the stator 30' lies within the rotor 30". The drive shaft 34 connected to the rotor 30" penetrates the stator 30'. The drive shaft 34 is mounted in a central sleeve of the support flange 31 and is preferably held so as to be axially secured.

The electric motor 30 can be received in a motor housing 39 which is established on, in particular plugged onto, an annular mounting 22 of the axial end face 20. The plug connection between the motor housing 39 and the annular mounting 22 can include a form-fitting securing mechanism for the housing. The motor housing 39 is advantageously open at the end face and is in particular closed by the axial end face 20 of the blower spiral 10.

At least one cooling air opening 23 for a first cooling air flow 60 is provided in the axial end face 20 of the blower spiral 10, on which the electric motor 30 is disposed. The cooling air opening 23 connects a pressure region 24 of the blower spiral 10 to the installation space of the electric motor 30. In the embodiment shown, the cooling air opening 23 lies within the fastening points 32 of the electric motor 30. In an axial view onto the rotor 30" of the electric motor 30, the cooling air opening 23 lies within the rotor 30" of the electric motor 30. A cooling air flow 60 which from the pressure region 24 flows toward the electric motor 30 by way of the cooling air opening 23 is a pressurized air flow. The cooling air flow 60 has a flow direction which from the blower spiral 10 is directed towards the electric motor 30, in particular directed onto the stator 30' of the electric motor 30.

The pressure region 24 in the blower spiral is configured in the gap 27 between the back side 28 of the fan wheel 8 and the axial end face 20. The pressure level here increases as the spacing from the rotational axis 36 of the drive shaft increases.

In the embodiment shown, the cooling air opening 23 includes a plurality of partial air openings 25. The partial air openings 23 that form the cooling air opening 25 are disposed sequentially in the rotation direction D of the fan wheel 8. The partial air openings 25 lie in particular on a common circumferential circle 26 about the rotational axis 36 of the drive shaft 34 of the electric motor 30. Adjacent partial air openings 25 are at equidistant mutual spacings a. As is shown in FIG. 4, the partial air openings 25 lie in an annular space between the shaft opening 21 and the fastening elements 32 of the support flange 31 of the electric motor 30.

Figure 5:
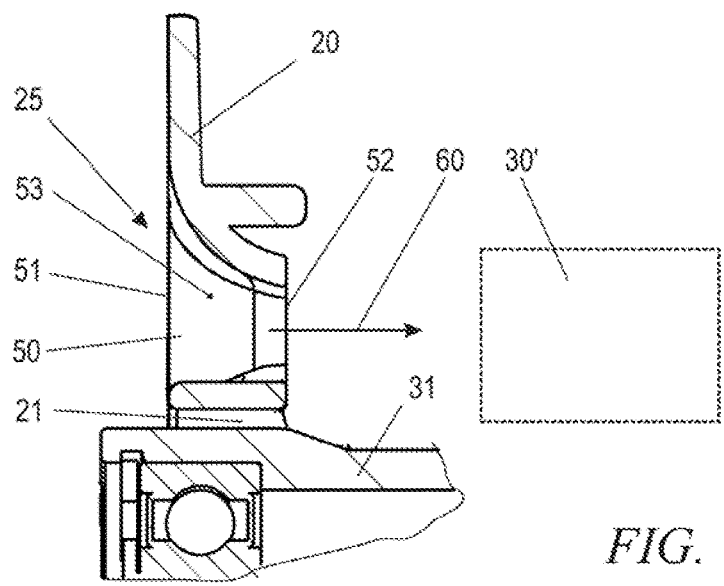
FIG. 5 in an enlarged illustration shows a schematic section through a partial air opening of the first cooling air opening.

Shown in FIG. 5 is an axial section through a partial air opening 25. The partial air opening 25 is configured as a short air channel 50 having an air inlet 51 and an air outlet 52. A flow ramp 53 is configured between the air inlet 51 and the air outlet 52, the flow ramp 53 in the rotation direction D of the fan wheel 8 sloping towards the air outlet 52. The flow ramp 53 in terms of the length thereof extends in the rotation direction D of the fan wheel 8. The air inlet 51 is configured so as to be larger than the air outlet 52.

When rotating the fan wheel 8 in the rotation direction D, a pressure region 24 is configured in the blower spiral 10 in the gap 27 between the back side 28 of the fan wheel 8 and the axial end face 20 of the blower spiral 10. By virtue of the rotation of the fan wheel 8, the masses of air in the pressure region 24 move in the rotation direction D of the fan wheel 8. The flow ramp 53 which from the inside of the end face 20 slopes towards the air outlet 52 of the air channel 50 on the outside of the end face 20 facilitates the outflow of the pressurized air flow in the rotation direction D of the fan wheel 8.

Provided after the exit of a cooling air flow 60 from the air outlet 52 of the partial air opening 25 of the cooling air opening 23, the cooling air flow 60 forming a pressurized air flow, is a flow throttle 29 in the flow path through the electric motor 30 as a result of which flow throttle 29 the dwell time of the masses of air of the cooling air flow 60 within the electric motor 30 can be increased. The cooling air flow 60, configured as a pressurized air flow, is decelerated by the flow throttle 29. Provided in this way is the possibility of an intensive thermal transfer such that a large quantity of heat can be discharged from the electric motor 30.

Figure 7:
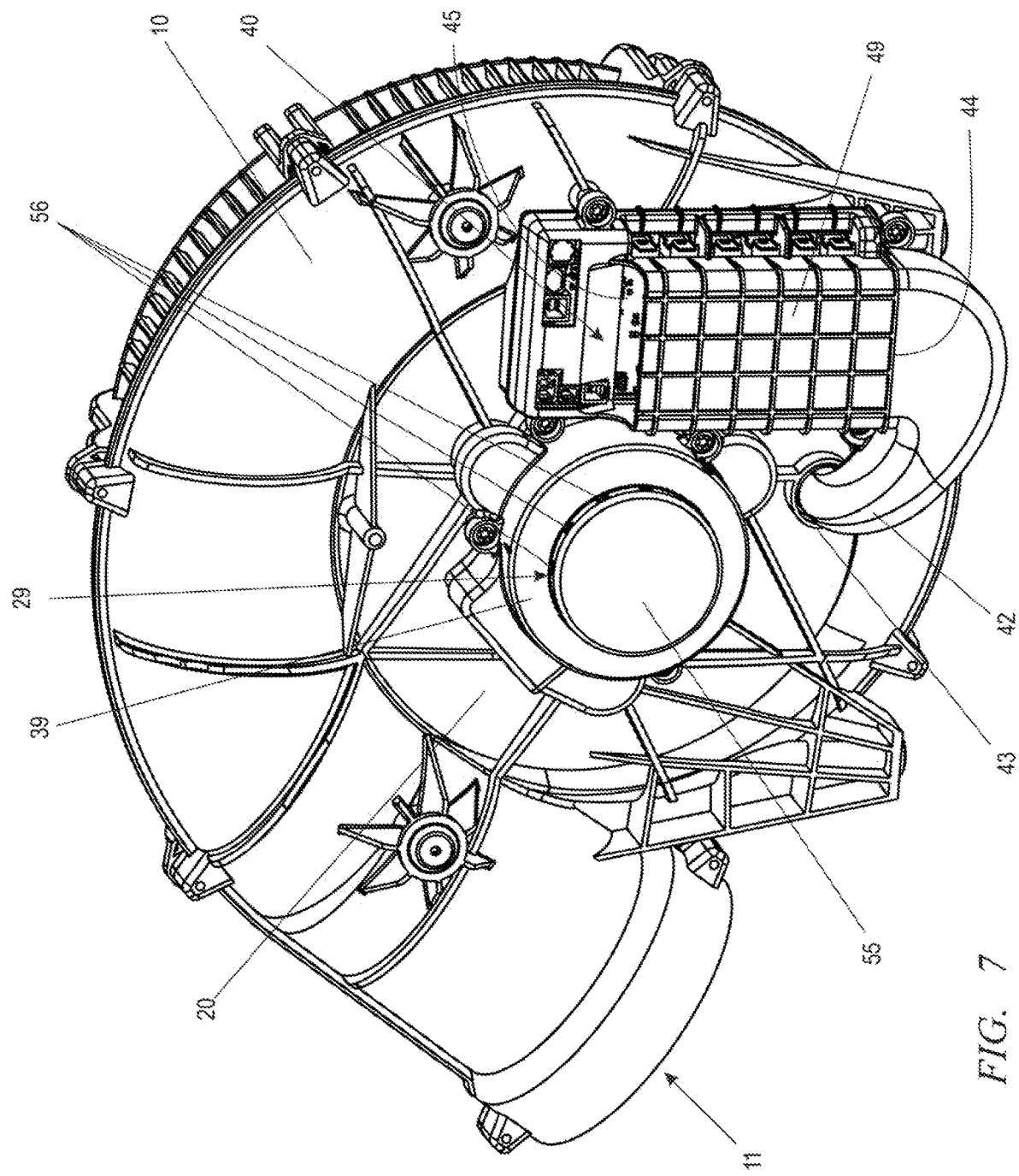
FIG. 7 shows a perspective view onto the external side of the axial end face of the blower spiral having an electric motor held thereon and control electronics held thereon.

In the embodiment shown, the flow throttle 29 is configured in the base of the motor housing 39. As is shown in FIG. 7, a plurality of openings 56 are configured across the circumference of a housing dome 55. The total of the opening cross sections of the openings 56 forms the flow throttle 29. The total of the opening cross sections of the openings 56 is preferably configured so as to be smaller than the total of the opening cross sections of the partial air openings 25 that form the cooling air opening 23. The opening cross section of the cooling air opening 23 that supplies the cooling air flow 60 is configured so as to be larger than the total of the opening cross sections of the openings 56 that discharge the cooling air from the motor housing 39. As a result, an accumulation of cooling air in the motor housing 39 can be caused, by way of which the dwell time of the cooling air within the motor housing 39 is increased. Efficient cooling of the electric motor 30 is guaranteed independently of the height of the pressure level in the pressure region of the blower spiral 10, from where the cooling air opening 23 diverts the pressurized air flow.

Figure 8:
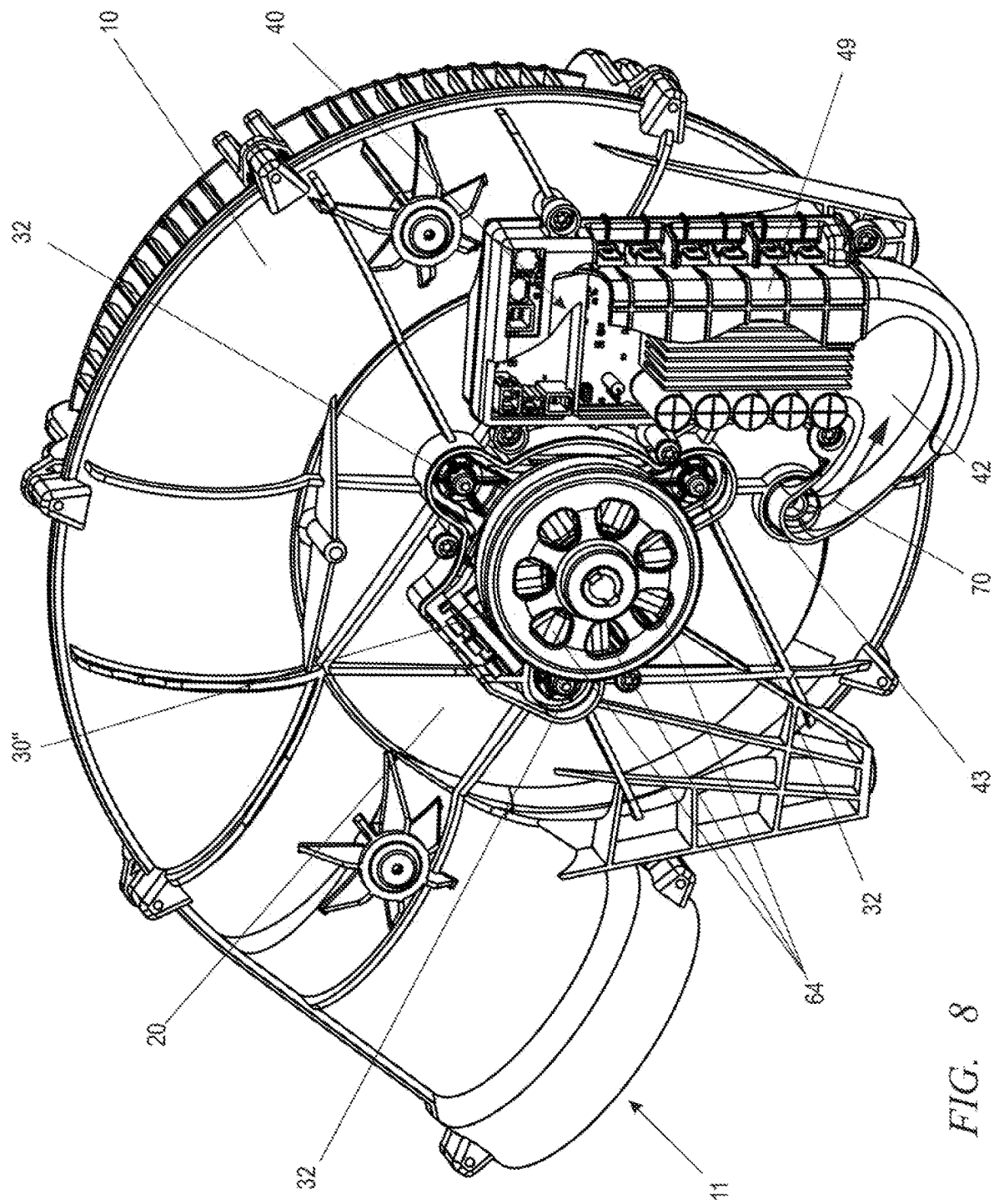
FIG. 8 shows a view according to FIG. 7 with a partial section through a motor housing that receives the electric motor and an electronics housing that receives the control electronics.

As is shown in FIG. 8, the base of the rotor 30" of the electric motor 30, preferably configured as an external rotor motor, is configured with cut-outs 64. The cut-outs 64 facilitate an outflow of the cooling air that has been supplied to the electric motor 30, from the region of the stator 30' into the housing dome 55 (FIG. 7).

As is shown in FIGS. 7 and 8, the electric motor 30 and the control electronics 40 are disposed on the same end face 20 of the blower spiral 10. The electric motor 30 as well as the control electronics 40 are preferably held on the end face 20 per se. The control electronics 40 by way of the connecting line 7 is connected to the operator-controlled elements such as the switching lever 17 and further operator-controlled elements 19 of the handle 13. As a function of an actuating signal of the switching lever 17, which may be configured as an analogue signal, as a digital signal, or as a signal of a selected output stage, for example, the electric motor 30 is actuated by way of a rotating speed that corresponds to the signal of the switching lever 17. The energy required for operating the electric motor 30 and the control electronics 40 is provided by a battery pack 75 which can be held on the carrier 5 of the electric blower apparatus 1.

Figure 6:
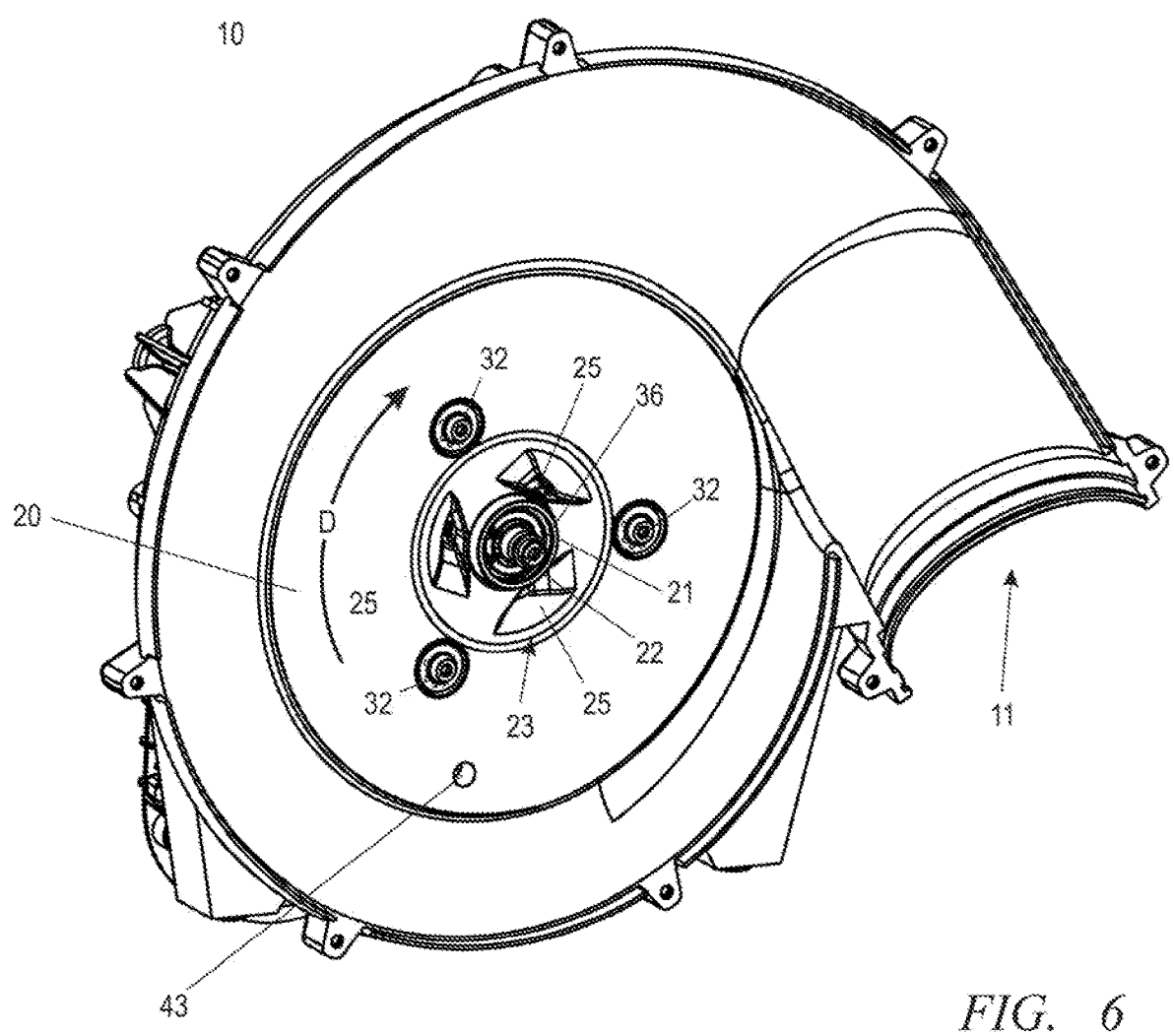
FIG. 6 shows an external view onto the axial end face of the blower spiral that supports the driving electric motor, with an illustration of the first cooling air opening and the second cooling air opening.

A cooling air flow 70 which from a pressure region of the blower spiral 10 flows towards the control electronics 40 is supplied to the control electronics 40. To this end, a further cooling air opening 43 (FIGS. 4, 6) is provided in the axial end face 20. It is shown in FIG. 4 that the further, second cooling air opening 43 is at a larger spacing $R_2$ from the rotational axis 36 of the drive shaft 34 than the first cooling air opening 23, or the partial air openings 25 that form the first cooling air opening 23, respectively. The first cooling air opening 23 is at a radial spacing $R_1$ from the rotational axis 36 of the drive shaft 34. The spacing $R_2$ is larger than the spacing $R_1$. The spacing $R_2$ is particularly preferably 2 to 4 times larger than the spacing $R_1$. The first cooling air opening 23 lies in a pressure region 24 of the blower spiral 10, which has a lower pressure level than the pressure region in which the second cooling air opening 43 is provided. The second cooling air opening 43 diverts from the blower spiral 10 a pressurized air flow from a pressure region having a higher pressure level.

The first cooling air flow 60, which cools the electric motor 30, flows from the first cooling air opening 23 as a pressurized air flow towards the electric motor 30. The second cooling air flow 70, which cools the control electronics 40, flows from the second cooling air opening 43 as a pressurized air flow towards the control electronics 40. The first cooling air flow 60 (FIG. 3) and the second cooling air flow 70 (FIG. 8) are mutually separate cooling air flows. In this way, reliable cooling of the electric motor 30, on the one hand, and of the control electronics 40, on the other hand, is guaranteed. Each cooling air flow 60 or 70, respectively, in terms of the air quantity thereof, and in particular also in terms of the flow rate thereof, can advantageously be adjusted to the requirements of the cooling desired without the respective other cooling air flow 70 or 60, respectively, being compromised. In the embodiment shown, the second cooling air opening 43 is connected to the control electronics 40 by way of a cooling channel 42. The second cooling air flow 70, configured as a pressurized air flow, from the blower spiral 10 enters the cooling channel 42 by way of the second cooling air opening 43, wherein the cooling channel 42 widens along the flow path thereof to the control electronics 40. As a result, a reduction of the flow rate of the pressurized air flow exiting the second cooling air opening 43 can be achieved.

In the embodiment shown, the electric motor 30 is received in the motor housing 39, the interior thereof configuring a first cooling air chamber 62.

The control electronics 40 are received in an electronics housing 49 which is separate from the motor housing 39. The electronics housing 49 forms a further cooling air chamber 72, which is separate from the cooling air chamber 62 of the motor housing 39.

The first cooling air flow 60, configured as a pressurized air flow, flows into the cooling air chamber 62 of the motor housing 39 by way of the first cooling opening 23. The second cooling air flow 70 flows into the further cooling air chamber 72 of the electronics housing 49 by way of the second cooling air opening 43 and the cooling channel 42. In an advantageous embodiment of the disclosure it is provided that the cooling channel 42, proceeding from the second cooling air opening 43, widens to the cross section of the cooling air chamber 72 of the electronics housing 49. The cooling air channel 42 on an end face 44 of the electronics housing 49 adjoins the cooling air chamber 72. The opposite end face 46 of the electronics housing 49 is open and forms a cooling air outlet.

Figure 9:
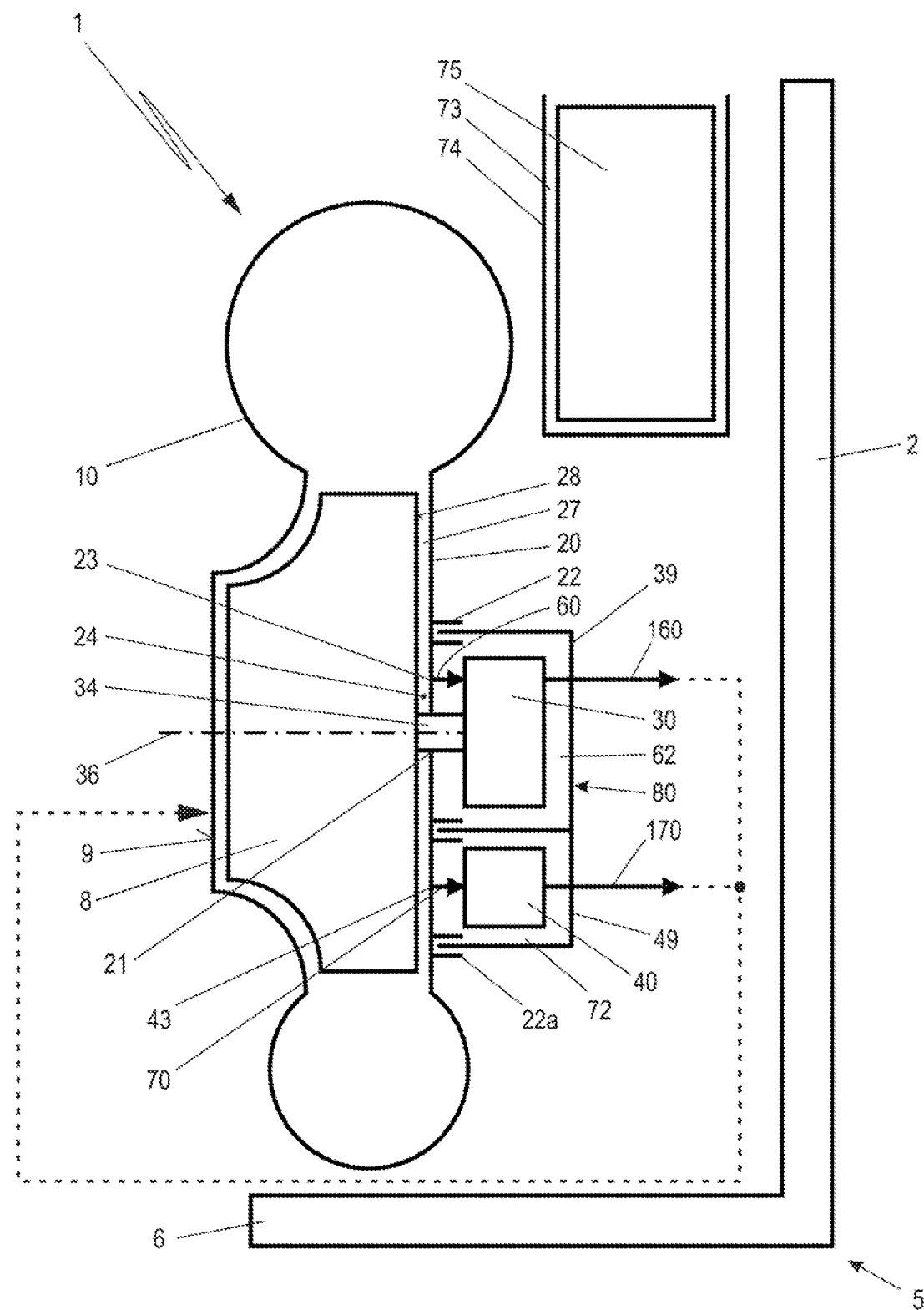
FIG. 9 shows a schematic view of a blower apparatus according to the disclosure having a common housing for the electric motor and the electronics.

The blower apparatus 1 on the carrier 5 which includes the back plate 2 and the base plate 6 is schematically reproduced in FIG. 9. The motor housing 39 and the electronics housing 49 in this embodiment shown form a common housing 80. The common housing 80 is advantageously plugged onto a housing mounting 22, wherein a housing mounting 22a for the electronics housing 49 is provided in addition to the housing mounting 22 of the motor housing 39. The common housing 80 is held on the axial end face 20 of the blower spiral 10 by way of the housing mountings 22, 22a.

The first cooling air flow 60 which for cooling the electric motor 30 flows from the pressure region 24 of the blower spiral 10 to the motor housing 39 by way of the first cooling air opening 23 enters directly into the cooling air chamber 62 of the motor housing 39. Accordingly, a second cooling air flow 70 enters the cooling air chamber 72 of the electronics housing 49 by way of the second cooling air opening 43. The motor housing 39 as air outlet openings has openings 56 by way of which an exhaust air flow 160 of the motor 30 exits. Accordingly, the electronics housing 49 has an air outlet by way of which an exhaust air flow 170 of the control electronics 40 exits.

In the illustration as per FIG. 9, the first cooling air flow 60 and the second cooling air flow 70 are mutually separate cooling air flows. It can be expedient for a cooling air flow 60 first to be routed through the motor housing 39 and subsequently through the electronics housing 49. In an embodiment of this type, the cooling air opening 43 into the electronics housing 49 can advantageously be dispensed with. Alternatively, it is also possible for the cooling air flow first to be routed through the electronics housing 49 and subsequently through the motor housing 39. In an embodiment of this type, the cooling air opening 23 into the motor housing 39 can advantageously be dispensed with.

In a further embodiment of the disclosure it can be expedient for the exhaust air flows 160 and 170 to be supplied to the intake opening 9 of the blower spiral 10, as is illustrated by dashed lines in FIG. 9. An exhaust air flow blown into the environment is avoided in this way.

Figure 10:
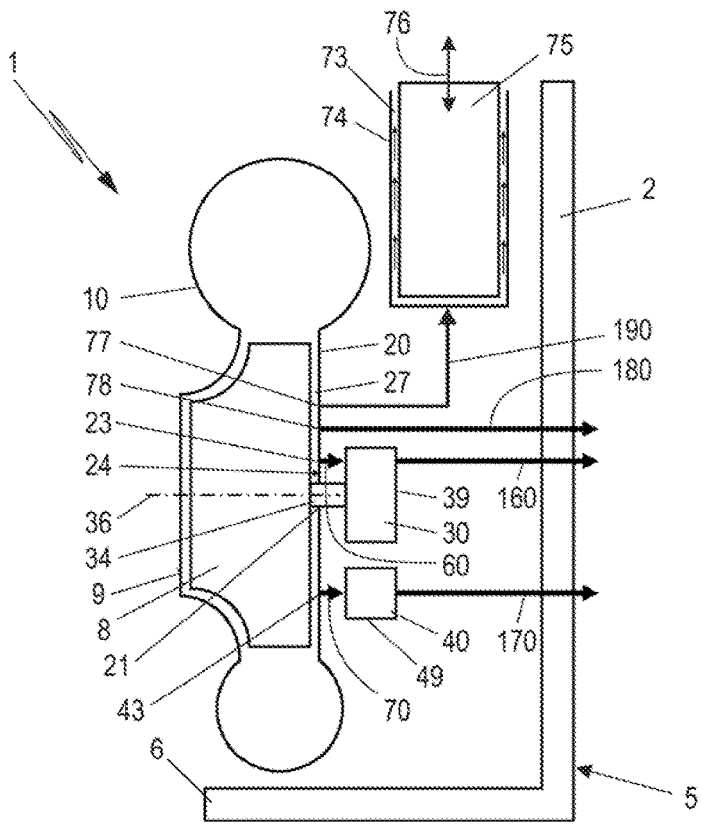
FIG. 10 shows a schematic illustration of the cooling air flows supplied to the electric motor and to the control electronics, and of a further cooling air flow supplied to the battery pack in a housing duct.

Besides the cooling air opening 23 for the cooling of the motor and the cooling air opening 43 for the cooling of the control electronics 40, further cooling air openings 77 and 78 are configured in the axial end face 20 of the blower spiral 10 in the embodiment as per FIG. 10.

Cooling air, which as the cooling air flow 190 is supplied to a housing duct 74, is diverted from the gap 27 between the end face 20 and the fan wheel 8 by way of the cooling air opening 77. The cooling air flow 190 advantageously enters the interior of the housing duct 74 in the base region of the housing duct 74. The housing duct 74 is provided for receiving a battery pack 75 which can be inserted into the housing duct 74 or be retrieved from the latter in the direction of the double arrow 76. The assembly is chosen such that a gap 73 by way of which the cooling air flow 190 directed into the housing duct 74 flows towards the outside is configured between the battery pack 75, which is inserted into the housing duct 74, and the housing duct 74.

The cooling air flow 190 is a pressurized air flow such that this results in a forced flow from the base region of the housing duct 74 to the outside by way of the gap 73 and the insertion opening. Forced cooling of the battery pack 75 is guaranteed as a result.

A further cooling air flow 180, which is supplied directly to the back plate 2, is diverted from the blower spiral 10 by way of the cooling air opening 78. The back plate 2 is configured in such a manner that the back plate 2 is passed through by the cooling air flow 180. The back of a user can be cooled at high ambient temperatures.

Alternatively or additionally, the warm exhaust air flows 160 and 170 of the motor cooling and of the electronics cooling can be supplied to the back plate 2. The back plate 2 is configured in such a manner that the back plate 2 is passed through by a flow of supplied exhaust air flow 160 and/or 170. The back of a user can be heated at low ambient temperatures as a result. The exhaust air flows 160 and 170 discharge the heat of the electric motor 30 and/or of the control electronics 40. Depending on the temperature of the inducted ambient air, an exhaust air flow 160, 170 can have a temperature of, for example, 20° to 40°, or else even higher. There is sufficient thermal energy available for heating the back of a user.

Figure 11:
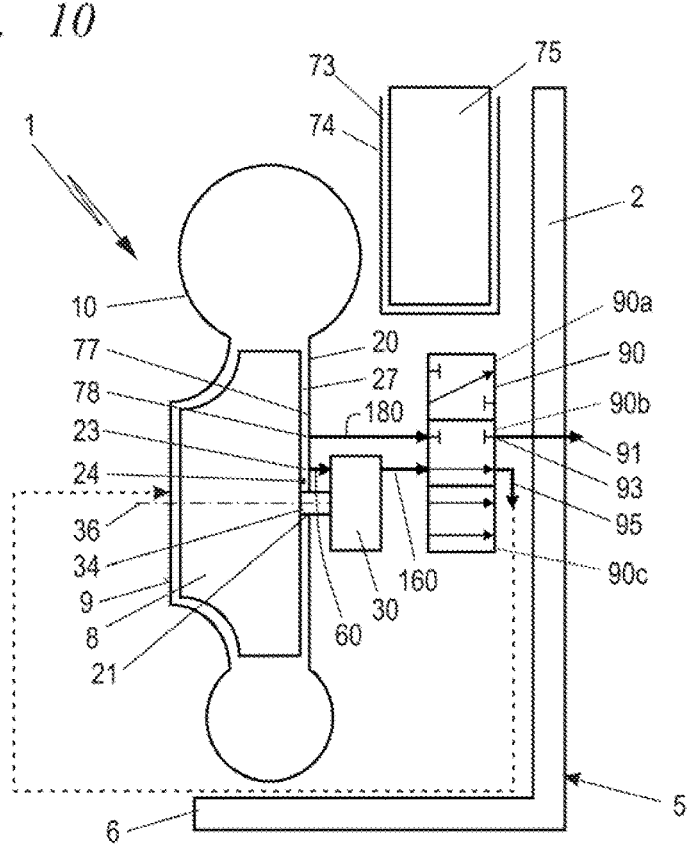
FIG. 11 shows a schematic illustration of an air flow of cooling air and exhaust air that is supplied to the back plate by way of a flow valve.

Shown by way of example in FIG. 11 is a flow valve 90 by way of which the cooling air flow 180 and a warm exhaust air flow 160 of the back plate 2 is controlled. The flow valve 90 has three switched positions 90a, 90b, 90c. An air flow 91 is supplied to the back plate 2 by way of a first outlet 93 of the flow valve 90. The back plate 2 is configured in such a manner that the back plate 2 is at least partially passed through by the air flow 91. The back of a user can be heated or cooled by way of the air flow 91. The dissipation of a non-utilized exhaust air flow takes place by way of a second outlet 95. The dissipation of the exhaust air flow 160, 170 expediently takes place to the intake opening 9 of the blower spiral 10, as is illustrated by dashed lines in FIG. 11.

Figure 12:
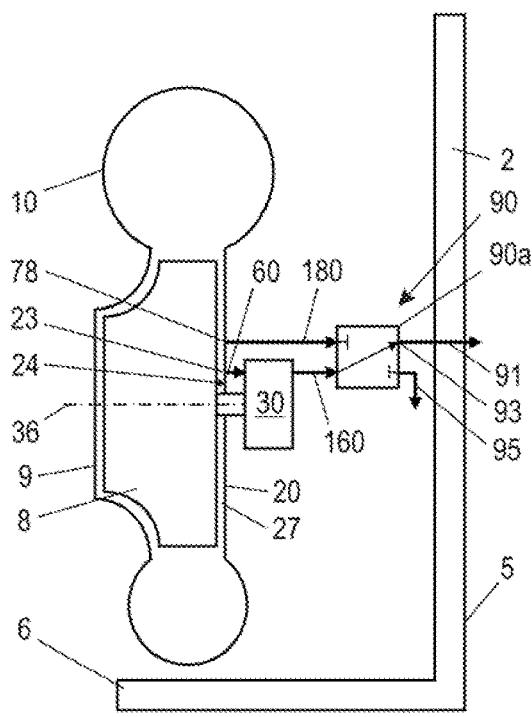
FIG. 12 shows a schematic illustration of a switched position of the flow valve for heating the back plate.

The flow valve 90 in the illustration as per FIG. 12 is in the switched position 90a. The cooling air flow 180 is blocked; the exhaust air flow 160 is switched to the first outlet 93. The air flow 91 that is supplied to the back plate 2 is formed by the exhaust air flow 160. The back of a user can be heated.

Figure 13:
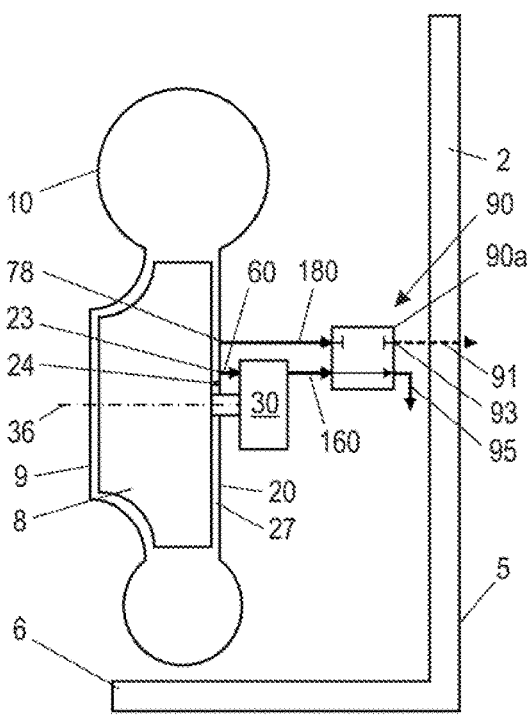
FIG. 13 shows a schematic illustration of the flow valve corresponding to that of FIG. 12, in a switched position blocking the cooling air flow and the exhaust air flow; and, FIG. 14 shows a schematic illustration of a switched position of the flow valve corresponding to that of FIG. 12, for cooling the back plate.

The flow valve 90 in the illustration as per FIG. 13 is in the blocking position 90b of the flow valve 90. No air flow is supplied to the back plate 2. The outlet 93 of the flow valve 90 is blocked. The exhaust air flow 160 of the motor cooling, which is supplied to the flow valve 90, is switched to the second outlet 95 and dissipated by the latter. The dissipation of the exhaust air flow preferably takes place to the intake opening 9 of the blower spiral 10.

Figure 14:
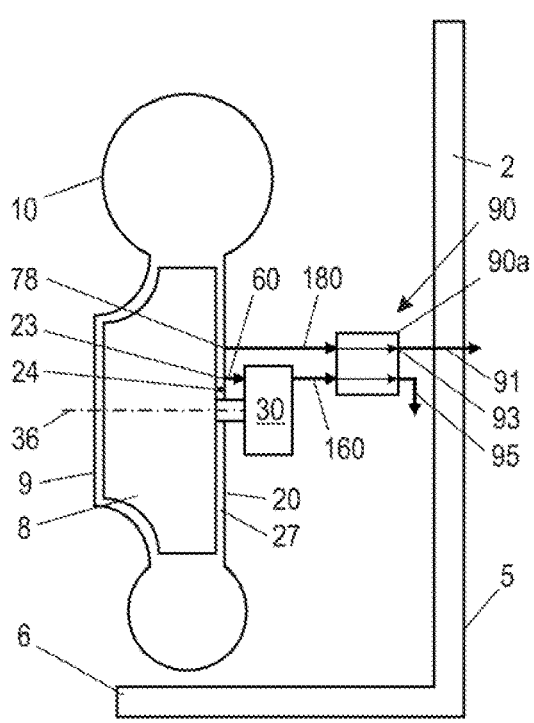

The flow valve 90 in the illustration as per FIG. 14 is in the third switched position 90c. In this switched position, the cooling air flow 180 is switched to the first outlet 93 of the flow valve 90. The air flow 91 to the back plate 2 is formed by the cooling air flow 180. The back of a user can be cooled. In the third switched position 90c, the exhaust air flow 160 exiting the motor housing is supplied to the outlet 95. The exhaust air flow 160 is blown into the environment by way of the outlet 95, or is advantageously supplied to the intake opening 9 of the blower spiral 10.

It is understood that the foregoing description is that of the preferred embodiments of the invention and that various changes and modifications may be made thereto without departing from the spirit and scope of the invention as defined in the appended claims.

The invention claimed is:

1. An electric blower apparatus comprising:
a blower spiral having an axial end face defining a shaft opening;
a fan wheel configured to rotate in said blower spiral;
an electric motor disposed on said axial end face of said blower spiral and having a drive shaft which protrudes through said shaft opening in said axial end face and into said blower spiral;
said drive shaft being connected to said fan wheel;
said axial end face further defining a first cooling air opening, wherein a cooling air flow that cools said electric motor is routed by way of said first cooling air opening;
said first cooling air opening being disposed in a pressure region of said blower spiral; and,
said cooling air flow to said electric motor is a pressurized air flow having a flow direction which from said blower spiral is directed by way of said first cooling air opening to said electric motor;
the electric blower apparatus further comprising control electronics configured to energize the electric motor from an energy source in dependence upon an operator-controlled element;
wherein said cooling air flow is a first cooling air flow;
said axial end face of said blower spiral defining a second cooling opening by way of which a second cooling air flow is guided from said blower spiral to said control electronics via said second cooling opening; and,
said first cooling air flow and said second cooling air flow are mutually separate cooling air flows.

2. The electric blower apparatus of claim 1, wherein said first cooling air opening includes a single opening or a plurality of partial air openings.

3. The electric blower apparatus of claim 2, wherein said fan wheel defines a rotation direction; and, said plurality of partial air openings are disposed sequentially in said rotation direction of said fan wheel.

4. The electric blower apparatus of claim 2, wherein said plurality of partial air openings are, in the rotation direction of said fan wheel, disposed on a common circumferential circle about said drive shaft.

5. The electric blower apparatus of claim 2, wherein one of said plurality of partial air openings is configured as an air channel having an air inlet and an air outlet; and, a flow ramp is disposed between said air inlet on an inside of said axial end face and said air outlet on an outside of said axial end face; and, said flow ramp slopes down towards said air outlet in a rotation direction of the fan wheel.

6. The electric blower apparatus of claim 1, wherein said second cooling air flow is a pressurized air flow.

7. The electric blower apparatus of claim 1, wherein said second cooling air opening has a larger radial spacing from said shaft opening than said first cooling air opening.

8. The electric blower apparatus of claim 1, wherein said first cooling air opening is provided in a region of a low pressure level of said blower spiral in said axial end face; and, said second cooling air opening is provided in a region of a higher pressure level of said blower spiral in said axial end face of said blower spiral.

9. The electric blower apparatus of claim 1 further comprising:
a motor housing defining an interior forming a first cooling air chamber;
said electric motor being arranged in said motor housing;
an electronics housing defining a further cooling air chamber separate from said first cooling air chamber; and,
said control electronics being arranged in said electronics housing.

10. The electric blower apparatus of claim 9, wherein said motor housing and said electronics housing are both held on said axial end face of said blower spiral.

11. The electric blower apparatus of claim 9, wherein said motor housing and said electronics housing form a common housing.

12. The electric blower apparatus of claim 1 further comprising a support flange of a motor mount by way of which said electric motor is held on said axial end face of said blower spiral via a plurality of fastening elements; and, wherein said first cooling air opening lies radially within said plurality of fastening elements.

13. The electric blower apparatus of claim 1, wherein said axial end face defines a further cooling air opening; and, said further cooling air opening is configured to have a further pressurized air flow exiting said further cooling air opening as a further cooling air flow directed into a housing duct for receiving a battery pack.

14. The electric blower apparatus of claim 1, wherein at least one of a further cooling air flow diverted from said blower spiral by way of a further cooling air opening and an exhaust air flow, exiting at least one of a motor housing and an electronics housing, is routed through a back plate of the electric blower apparatus.

15. The electric blower apparatus of claim 1, wherein an exhaust air flow exiting at least one of a motor housing and an electronics housing is supplied to an intake opening of the blower spiral.

16. An electric blower apparatus comprising:
a blower spiral having an axial end face defining a shaft opening;
a fan wheel configured to rotate in said blower spiral;
an electric motor disposed on said axial end face of said blower spiral and having a drive shaft which protrudes through said shaft opening in said axial end face and into said blower spiral;
said drive shaft being connected to said fan wheel;
said axial end face further defining a first cooling air opening, wherein a cooling air flow that cools said electric motor is routed by way of said cooling air opening;
said first cooling air opening being disposed in a pressure region of said blower spiral;
said cooling air flow to said electric motor is a pressurized air flow having a flow direction which from said blower spiral is directed by way of said first cooling air opening to said electric motor; and, a flow throttle, wherein said cooling air flow defines a flow path and said flow throttle is disposed in said flow path after said cooling air flow exits said first cooling air opening.

17. An electric blower apparatus comprising:
a blower spiral having an axial end face defining a shaft opening;
a fan wheel configured to rotate in said blower spiral;
an electric motor disposed on said axial end face of said blower spiral and having a drive shaft which protrudes through said shaft opening in said axial end face and into said blower spiral;
said drive shaft being connected to said fan wheel;
said axial end face further defining a first cooling air opening, wherein a cooling air flow that cools said electric motor is routed by way of said cooling air opening;
said first cooling air opening being disposed in a pressure region of said blower spiral;
said cooling air flow to said electric motor is a pressurized air flow having a flow direction which from said blower spiral is directed by way of said first cooling air opening to said electric motor;
the electric blower apparatus further comprising control electronics configured to energize the electric motor from an energy source in dependence upon an operator-controlled element;
wherein said cooling air flow is a first cooling air flow;
said axial end face of said blower spiral defines a second cooling opening by way of which a second cooling air flow is guided from said blower spiral to said control electronics via said second cooling opening;
a motor housing defining an interior forming a first cooling air chamber;
said electric motor being arranged in said motor housing;
an electronics housing defining a further cooling air chamber separate from said first cooling air chamber;
said control electronics being arranged in said electronics housing; and,
wherein said first cooling air flow enters said first cooling air chamber via said first cooling air opening; and, said second cooling air flow enters said further cooling air chamber via said second cooling air opening.

18. An electric blower apparatus comprising:
a blower spiral having an axial end face defining a shaft opening;
a fan wheel configured to rotate in said blower spiral;
an electric motor disposed on said axial end face of said blower spiral and having a drive shaft which protrudes through said shaft opening in said axial end face and into said blower spiral;
said drive shaft being connected to said fan wheel;
said axial end face further defining a first cooling air opening, wherein a cooling air flow that cools said electric motor is routed by way of said cooling air opening;
said first cooling air opening being disposed in a pressure region of said blower spiral;
said cooling air flow to said electric motor is a pressurized air flow having a flow direction which from said blower spiral is directed by way of said first cooling air opening to said electric motor;
wherein at least one of a further cooling air flow diverted from said blower spiral by way of a further cooling air opening and an exhaust air flow, exiting at least one of a motor housing and an electronics housing, is routed through a back plate of the electric blower apparatus;
a controllable flow valve; and,
at least one of said further cooling air flow and said exhaust air flow being supplied to said back plate via said controllable flow valve.

* * * * *